United States Patent
Arita et al.

(10) Patent No.: US 8,749,105 B2
(45) Date of Patent: Jun. 10, 2014

(54) MAGNETIC INDUCTOR ROTARY MACHINE AND FLUID TRANSFER APPARATUS THAT USES THE SAME

(75) Inventors: Hideaki Arita, Tokyo (JP); Masaya Inoue, Tokyo (JP); Masahiro Iezawa, Tokyo (JP); Toshihiko Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 12/990,952

(22) PCT Filed: Apr. 22, 2009

(86) PCT No.: PCT/JP2009/057972
§ 371 (c)(1),
(2), (4) Date: Nov. 4, 2010

(87) PCT Pub. No.: WO2009/139278
PCT Pub. Date: Nov. 19, 2009

(65) Prior Publication Data
US 2011/0058967 A1    Mar. 10, 2011

(30) Foreign Application Priority Data
May 14, 2008    (JP) .................................. 2008-127194

(51) Int. Cl.
*H02K 21/28*    (2006.01)
*H02K 21/38*    (2006.01)
*H02K 1/14*    (2006.01)

(52) U.S. Cl.
USPC ............ 310/181; 310/112; 310/165; 310/269

(58) Field of Classification Search
USPC ................. 310/162, 166, 168, 171, 179–181, 310/49.01, 49.43, 49.46, 112, 114, 165, 269
See application file for complete search history.

(56) References Cited

U.S. PATENT DOCUMENTS 3,293,459 A * 12/1966 Kreuter et al. ............. 310/49.46
4,385,251 A *  5/1983 Mallick et al. ................ 310/178
(Continued)

FOREIGN PATENT DOCUMENTS

JP    48 43111    6/1973
JP    60 009353   1/1985
(Continued)

OTHER PUBLICATIONS

International Search Report issued Jul. 14, 2009 in PCT/JP09/057972 filed Apr. 22, 2009.

(Continued)

*Primary Examiner* — Tran Nguyen
(74) *Attorney, Agent, or Firm* — Oblon, Spivak, McClelland, Maier & Neustadt, L.L.P.

(57) ABSTRACT

A high-efficiency magnetic inductor rotary machine in which eddy current loss is reduced even if driven at super-high-speed rotation, and a fluid transfer apparatus that uses the same. In the magnetic inductor rotary machines, first and second stator cores are disposed coaxially such that circumferential positions of teeth are aligned, and first and second rotor cores are fixed coaxially to a rotating shaft such that salient poles are offset by a pitch of half a salient pole circumferentially, and are disposed on an inner peripheral side of the first and second stator cores. A salient pole width of the salient poles of the first and second rotor cores is configured so as to be greater than an opening width of slots of a stator.

7 Claims, 8 Drawing Sheets

(56) References Cited

U.S. PATENT DOCUMENTS

| | | | |
|---|---|---|---|
| 4,769,993 A | 9/1988 | Kawamura | |
| 4,899,072 A * | 2/1990 | Ohta | 310/49.46 |
| 5,168,190 A * | 12/1992 | Bahn | 310/166 |
| 5,304,882 A * | 4/1994 | Lipo et al. | 310/156.53 |
| 5,545,938 A * | 8/1996 | Mecrow | 310/156.64 |
| 5,682,073 A * | 10/1997 | Mizuno | 310/165 |
| 5,811,905 A * | 9/1998 | Tang | 310/179 |
| 5,844,343 A * | 12/1998 | Horst | 310/184 |
| 6,008,561 A * | 12/1999 | Tang | 310/183 |
| 6,075,302 A * | 6/2000 | McCleer | 310/166 |
| 6,078,122 A * | 6/2000 | Tang et al. | 310/165 |
| 6,194,804 B1 * | 2/2001 | Nashiki | 310/166 |
| 6,252,325 B1 * | 6/2001 | Nashiki | 310/168 |
| 6,897,591 B2 * | 5/2005 | Peachee et al. | 310/166 |
| 6,903,477 B2 * | 6/2005 | Kusase et al. | 310/180 |
| 7,034,422 B2 * | 4/2006 | Ramu | 310/114 |
| 7,034,425 B2 * | 4/2006 | Detela | 310/162 |
| 7,642,685 B2 * | 1/2010 | Nakayama et al. | 310/211 |
| 8,245,802 B2 * | 8/2012 | Inoue et al. | 180/65.28 |
| 2006/0192457 A1 * | 8/2006 | Nakayama et al. | 310/211 |
| 2007/0145847 A1 * | 6/2007 | Komuro et al. | 310/156.29 |

FOREIGN PATENT DOCUMENTS

| | | | |
|---|---|---|---|
| JP | 60 195330 | 10/1985 | |
| JP | 61-176977 * | 11/1986 | H02K 21/44 |
| JP | 8 214519 | 8/1996 | |
| JP | 2003-79117 | 3/2003 | |
| JP | 2003 180059 | 6/2003 | |
| JP | 2004 88880 | 3/2004 | |
| JP | 2007 143286 | 6/2007 | |
| WO | 2008 059681 | 5/2008 | |

OTHER PUBLICATIONS

U.S. Appl. No. 12/991,261, filed Nov. 5, 2010, Arita, et al.
Office Action issued on Jul. 2, 2013 in the corresponding Japanese Patent Application No. 2010-511938 (with English Translation).

* cited by examiner

Comparative Example

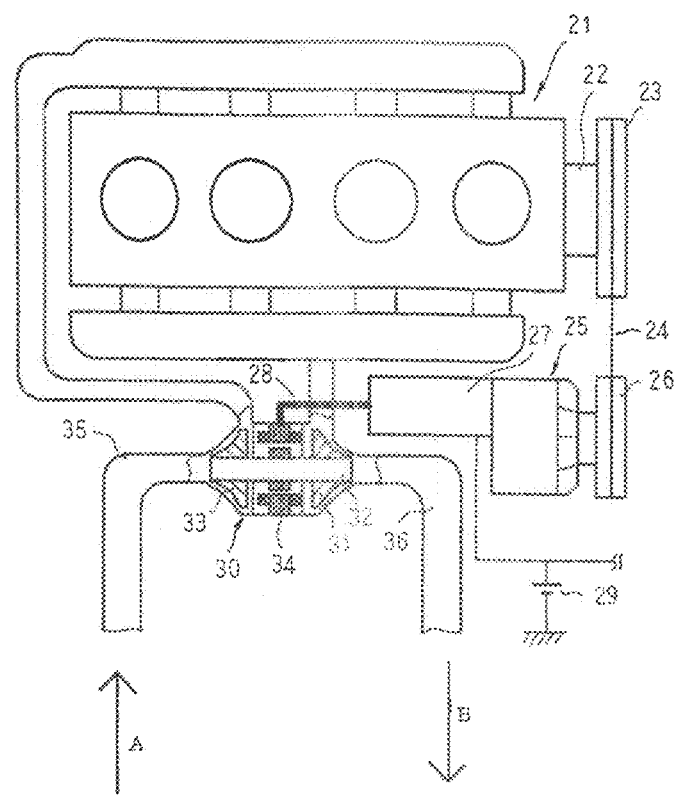

MAGNETIC INDUCTOR ROTARY MACHINE AND FLUID TRANSFER APPARATUS THAT USES THE SAME

TECHNICAL FIELD

The present invention relates to a magnetic inductor rotary machine suitable for being driven in a high-speed rotation region where core loss components are dominant in motor loss, and to a fluid transfer apparatus that uses the same.

BACKGROUND ART

In conventional permanent magnet synchronous rotary machines, magnets that function as a magnetic field means are mounted to a rotor. However, in motors that are used in "electrically assisted turbochargers" in which the motor is disposed between a turbine and a compressor of an automotive supercharger, super-high-speed rotation that exceeds 100,000 revolutions per minute is required, and since they are used in high-temperature environments, problems with magnet holding strength, thermal demagnetization, etc., arise if conventional permanent magnet synchronous rotary machines are used in these motors.

In consideration of these conditions, conventional magnetic inductor rotary machines have been proposed in which a magnetic field source such as a permanent magnet or a coil, etc., is disposed on a stator, and a rotor is configured such that cores to which gearwheel-shaped magnetic saliency is applied are disposed so as to be adjacent in two stages axially so as to be offset circumferentially by a pitch of half a pole (see Patent Literature 1 and 2, for example). These rotors are constituted only by a core that has a simple shape, and are superior in resistant strength against centrifugal forces when rotated at high speed. Thus, conventional magnetic inductor rotary machines make use of the advantages of these rotors, and it is conceivable that they could be used in high-speed motors such as electrically assisted turbochargers, etc.

Stator coil winding methods in conventional magnetic inductor rotary machines include distributed winding methods in which one coil per phase is wound so as to span a plurality of slots, and each of the phases of coil and coil ends have overlaps that cross in a circumferential direction (Patent Literature 1, for example), and concentrated winding methods in which one coil per phase is wound onto teeth so as not to span the slots, and none of the phases of coil and coil ends have overlaps that cross in a circumferential direction (Patent Literature 2, for example), and the rotor field methods include coils (Patent Literature 2, for example), and permanent magnets (Patent Literature 1, for example). In principle, combining the two stator coil winding methods and the two rotor field methods is unrestricted.

In conventional magnetic inductor rotary machines, because a rotating shaft of the rotor is rotatably supported by bearings that are disposed at two axial ends of the rotor, "axial resonance", in which the rotating shaft constitutes a resonance system and flexes and vibrates, is problematic. The longer the interval between the bearings, and the faster the rotational speed of the rotor, the more likely that this axial resonance is to arise, and in the worst cases, the rotor will contact the stator.

Now, restricting the interval between the bearings to increase the rotational speed at which axial resonance arises is effective as a countermeasure to avoid contact between the rotor and the stator during super-high-speed rotation. Due to constraints of resistant strength against centrifugal forces, rotor diameter is reduced, stator diameter is reduced together therewith, and distance of the coil ends of the stator coil from the central axis of the rotating shaft is shorter. On the other hand, increasing the diameter of the bearings is desirable from the viewpoint of securing rigidity and of securing an oil cooling flow channel. Consequently, if the bearings are disposed radially inside the coil ends of the stator coil, problems of interference between the bearings and the coil ends of the stator coil arise. Thus, shortening axial length of the coil ends of the stator coil as much as possible is effective in order to avoid interference between the bearings and the coil ends of the stator coil, and reduce the distance between the bearings.

From the above, in order to apply magnetic inductor rotary machines to applications in which high-speed rotation is required, it is desirable to adopt concentrated winding methods in which the axial length of the coil ends of the stator coil can be shortened compared to distributed winding methods.

CITATION LIST

Patent Literature

Patent Literature 1: Patent Laid-Open No. 2004-8880 (Gazette)

Patent Literature 2: Patent Laid-Open No. HEI 08-214519 (Gazette)

DISCLOSURE OF THE INVENTION

Problem to be Solved by the Invention

In conventional magnetic inductor rotary machines, a magnetic circuit is theoretically formed in which magnetic flux that is generated by the magnetic field source enters the salient poles at a first axial end of the rotor from the teeth at a first axial end of the stator, flows radially inward through the rotor, flows through the rotating shaft to a second axial end, and then flows radially outward through the rotor, enters the teeth at a second axial end of the stator from the salient poles at the second axial end of the rotor, flows radially outward through the stator, and flows to the first axial end through an outer frame of the stator. Here, a magnetic path coupling state between the salient poles of the rotor and the teeth of the stator changes with the rotation of the rotor, and the amount of axial magnetic flux that flows through internal portions of the rotary machine increases and decreases. As the amount of axial magnetic flux that flows through the rotor and the stator fluctuates, laminated core in-plane eddy current loss arises, and eddy current loss also arises in solid magnetic bodies such as the outer frame and the rotating shaft, etc. Since this eddy current loss increases in proportion to the square of the frequency, this eddy current loss is a serious problem in conventional magnetic inductor rotary machines, particularly when driven at high-frequencies such as when the fundamental frequency exceeds 1 kHz.

In conventional magnetic inductor rotary machines that include concentrated winding stator coils, the number of slots is reduced compared to distributed winding methods, and slot pitches are designed to be large. For this reason, the salient poles of the rotor proceed from a state facing the teeth of the stator, through a state of not facing the teeth of the stator at all, to a state facing the teeth of the stator together with rotation of the rotor because circumferential widths of slot openings of the stator are formed so as to be larger than circumferential widths of the salient poles of the rotor. As a result, the amplitude of the changes in magnetic path coupling state between the salient poles of the rotor and the teeth of the stator is large, also making the amplitude of the increase and decrease in the amount of axial magnetic flux that flows through the internal portions of the rotary machine large. Thus, eddy current loss is increased, reducing motor efficiency.

These problems of fluctuation in the amount of axial magnetic flux are peculiar to magnetic inductor rotary machines that include concentrated winding stator coils. To put it another way, in magnetic inductor rotary machines that include distributed winding stator coils, core loss due to such fluctuations in the amount of axial magnetic flux does not reach problematic levels. That is, in those with distributed winding methods, slot opening widths are narrower in construction, and the salient poles of the rotor always face a plurality of slots in the stator. Thus, facing portions of the teeth interchange as the salient poles of the rotor rotate, and magnetic resistance between the rotor and the stator is always maintained in a low state. Consequently, since fluctuations in the amount of axial magnetic flux are not a problem when investigating magnetic inductor rotary machines that include distributed winding stator coils, eddy currents in a laminar plane direction have largely been ignored in conventional analyses such as magnetic analysis, etc., and core loss due to such fluctuations in the amount of axial magnetic flux has been a loss factor that has been hitherto overlooked.

The present applicants found that core loss increases more than expected when operating magnetic inductor rotary machines that include concentrated winding stator coils at super-high-speed rotation and, as a result of investigating by scanning core loss generating factors carefully, have succeeded in inventing the present invention based on the discovery that fluctuations in the amount of axial magnetic flux do constitute a factor that generates core loss therein.

The present invention aims to solve the above problems and an object of the present invention is to provide a high-efficiency magnetic inductor rotary machine in which eddy current loss is reduced even if driven at super-high-speed rotation, and a fluid transfer apparatus that uses the same.

Means for Solving the Problem

In order to achieve the above object, according to one aspect of the present invention, there is provided a magnetic inductor rotary machine including: a stator including: a stator core that is configured such that a first stator core and a second stator core that are prepared into identical shapes in which a plurality of teeth that partition off slots that have openings on an inner peripheral side are disposed so as to line up circumferentially so as to project radially inward from an inner peripheral surface of a cylindrical core back are disposed coaxially so as to be separated by a predetermined distance axially and such that circumferential positions of the teeth are aligned; and a stator coil that is mounted to the stator core in a concentrated winding; and a rotor in which a first rotor core and a second rotor core that are prepared into identical shapes in which salient poles are disposed at a uniform angular pitch circumferentially are fixed coaxially to a rotating shaft so as to be positioned on inner peripheral sides of the first stator core and the second stator core, respectively, and so as to be offset circumferentially by a pitch of half a salient pole from each other. The magnetic inductor rotary machine also includes a magnetic field means that is disposed on the stator, and that generates field magnetic flux such that the salient poles of the first rotor core and the salient poles of the second rotor core have different polarity; and an axial magnetic path forming member that is disposed so as to extend axially so as to link an outer peripheral surface of the core back of the first stator core and an outer peripheral surface of the core back of the second stator core. A salient pole width βr of the salient poles of the first rotor core and the second rotor core is configured so as to be greater than an opening width θs of the slots of the stator.

Effects of the Invention

According to the present invention, because a salient pole width βr of salient poles of a first rotor core and a second rotor core is configured so as to be greater than an opening width θs of slots of a stator, the rotor rotates in a state such that the salient poles always face the teeth of the stator. Thus, magnetic resistance between the rotor and the stator can be kept low, and fluctuations in the amount of magnetic flux kept to a minimum. Thus, fluctuations in the amount of magnetic flux that flows axially through the rotary machine are suppressed, and core loss that results from the occurrence of eddy currents is reduced, enabling a high-efficiency rotary machine to be achieved.

BRIEF DESCRIPTION OF THE DRAWINGS

FIG. 10 is a configuration diagram for a system that has an automotive supercharger according to Embodiment 4 of the present invention.

BEST MODE FOR CARRYING OUT THE INVENTION

Preferred embodiments of a magnetic inductor rotary machine according to the present invention and a fluid transfer apparatus that uses the same will now be explained with reference to the drawings.

Embodiment 1

Figure 1:
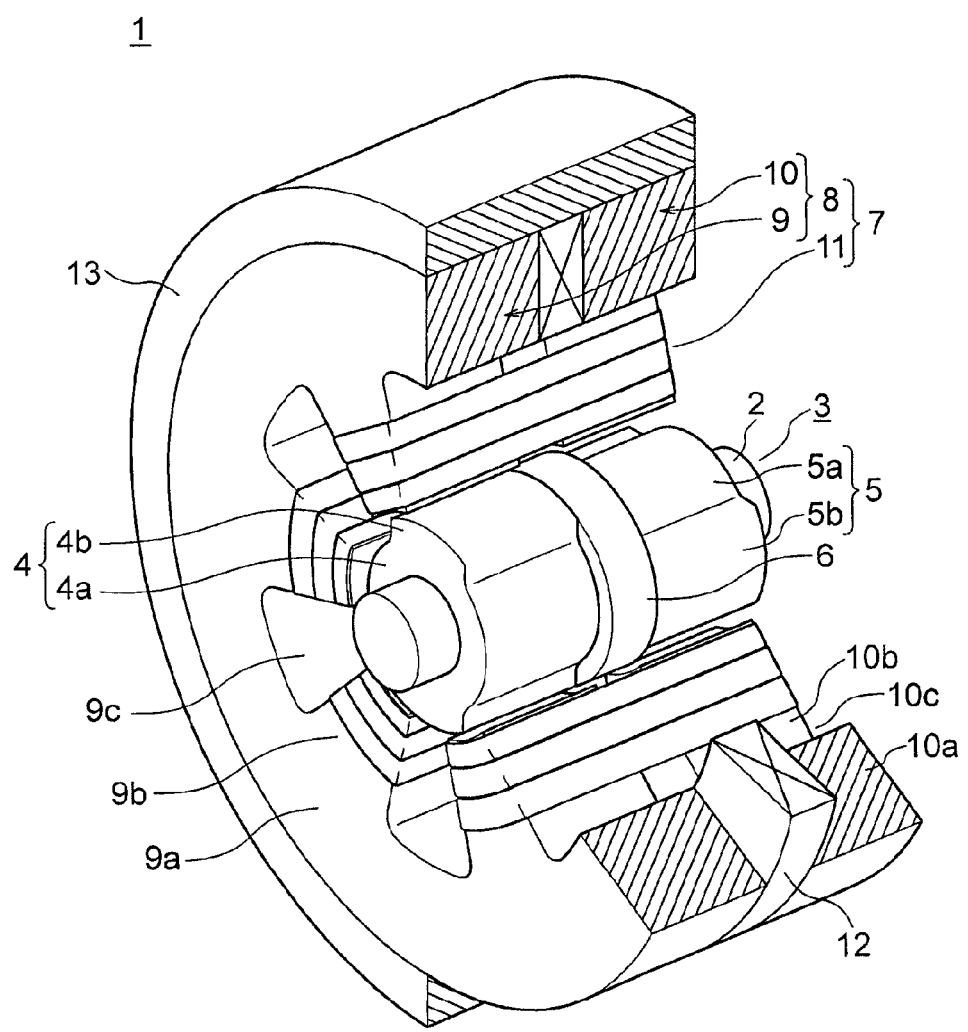
FIG. 1 is a partially cut away perspective that shows a configuration of a rotary machine according to Embodiment 1 of the present invention.
Figure 2:
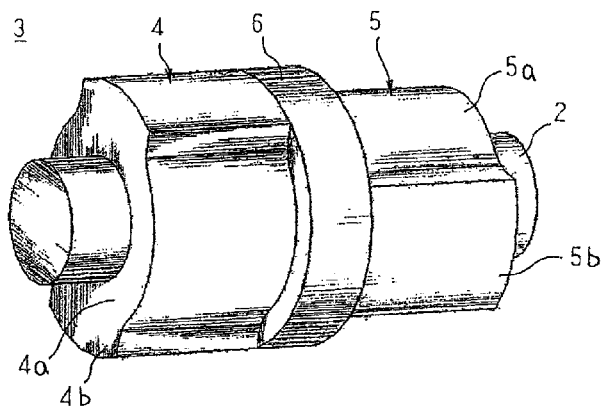
FIG. 2 is a perspective that shows a configuration of a rotor that can be used in the rotary machine according to Embodiment 1 of the present invention.

FIG. 1 is a partially cut away perspective that shows a configuration of a rotary machine according to Embodiment 1 of the present invention, and FIG. 2 is a perspective that shows a configuration of a rotor that can be used in the rotary machine according to Embodiment 1 of the present invention.

In FIGS. 1 and 2, a rotary machine 1 is a magnetic inductor synchronous rotary machine, and includes: a rotor 3 that is fixed coaxially to a rotating shaft 2 that is prepared using a solid magnetic body of iron, etc.; a stator 7 that is formed by mounting a stator coil 11 that functions as a torque generating driving coil to a stator core 8 that is disposed so as to surround the rotor 3; a field coil 12 that functions as a field means; and a housing 16 that houses the rotor 3, the stator 7, and the field coil 12.

The rotor 3 includes: first and second rotor cores 4 and 5 that are prepared, for example, by laminating and integrating a large number of magnetic steel plates that are formed into a predetermined shape; and a disk-shaped partitioning wall 6 that is prepared by laminating and integrating a predetermined number of magnetic steel plates, and through a central axial position of which a rotating shaft insertion aperture (not shown) is disposed. The first and second rotor cores 4 and 5 are prepared into identical shapes, and are constituted by: cylindrical base portions 4a and 5a through a central axial position of which rotating shaft insertion apertures (not shown) are disposed; and two salient poles 4b and 5b that are disposed so as to project radially outward from outer circumferential surfaces of the base portions 4a and 5a are disposed so as to extend axially, and are disposed at a uniform angular pitch circumferentially. The first and second rotor cores 4 and 5 are configured so as to be offset circumferentially by a pitch of half a salient pole, so as to be disposed in close proximity facing each other so as to have the partitioning wall 6 interposed, and so as to be fixed to the rotating shaft 2 that is inserted into their rotating shaft insertion apertures. The rotor 3 is rotatably disposed inside the housing 13 such that two ends of the rotating shaft 2 are supported by bearings (not shown).

The stator core 8 includes first and second stator cores 9 and 10 that are prepared by laminating and integrating a large number of magnetic steel plates that are formed into a predetermined shape. The first stator core 9 includes: a cylindrical core back 9a; and six teeth 9b that are disposed so as to project radially inward from an inner peripheral surface of the core back 9a at a uniform angular pitch circumferentially. Slots 9c that have openings on an inner peripheral side are partitioned off by the core back 9a and adjacent teeth 9b. The second stator core 10 is prepared into an identical shape to the first stator core 9, and includes: a cylindrical core back 10a; and six teeth 10b that are disposed so as to project radially inward from an inner peripheral surface of the core back 10a at a uniform angular pitch circumferentially. Slots 10c that have openings on an inner peripheral side are partitioned off by the core back 10a and adjacent teeth 10b. The first and second stator cores 9 and 10 are disposed inside the housing 13 such that circumferential positions of the teeth 9b and 10b are aligned, so as to be separated by an axial thickness of the partitioning wall 6, and so as to surround the first and second rotor cores 4 and 5, respectively.

The stator coil 11 has three phase coils 11 in which conducting wires are wound onto teeth 9b and 10b that form pairs that face each other axially without spanning the slots 9c and 10c in a "concentrated winding method". Specifically, the stator coil 11 is configured by winding three phases (U, V, and W) sequentially in concentrated windings and then repeating for a second time, on six pairs of teeth 9b and 10b that face each other axially. The coil ends of each of the phase coils do not have overlaps that cross each other in a circumferential direction.

The field coil 12 is a cylindrical coil in which a conductor wire is wound into a cylindrical shape, and is interposed between the core backs 9a and 10a of the first and second stator cores 9 and 10.

The housing 13 is prepared using a solid magnetic body of iron, etc., is disposed so as to be in close contact with an outer peripheral surface of the core back 9a of the first stator core 9 and an outer peripheral surface of the core back of the second stator core 10, and constitutes an axial magnetic path forming member.

Figure 3:
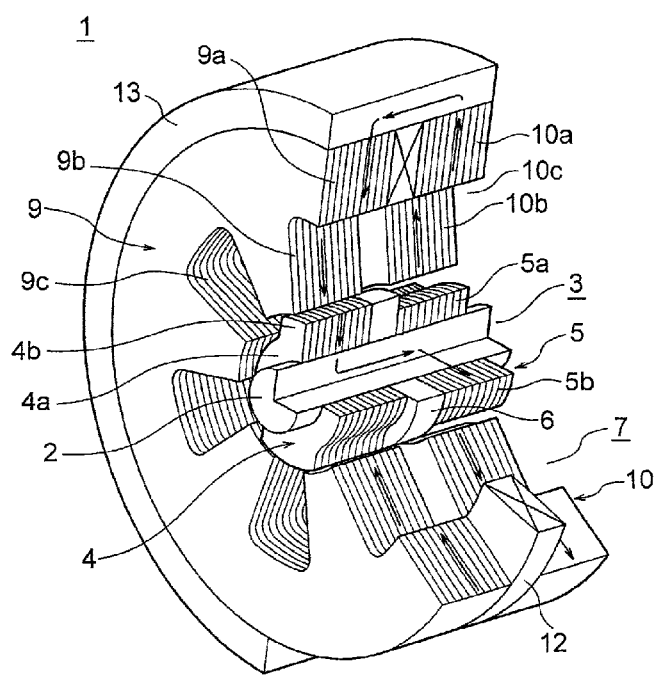
FIG. 3 is a partially cut away perspective for explaining flow of magnetic flux in the rotary machine according to Embodiment 1 of the present invention.

Next, operation of a rotary machine 1 that has been configured in this manner will be explained with reference to FIG. 3. FIG. 3 is a partially cut away perspective for explaining flow of magnetic flux in the rotary machine according to Embodiment 1 of the present invention.

When an electric current is passed through the field coil 12, magnetic flux is formed that enters the salient poles 4b of the first rotor core 4 from the teeth 9b of the first stator core 9, and flows radially inward through the first rotor core 4, and then a portion of the magnetic flux flows axially through the base portion 4a and the partitioning wall 6, and a remaining portion of the magnetic flux flows axially through the rotating shaft 2, as indicated by arrows in FIG. 3. Then, the magnetic flux enters the second rotor core 5, flows radially outward through the second rotor core 5, enters the teeth 10b of the second stator core 10 from the salient poles 5b of the second rotor core 5, flows radially outward through the second stator core 10, flows axially through the housing 13, and returns to the first stator core 9. Here, because the salient poles 4b and 5b of the first and second rotor cores 4 and 5 are offset by a pitch of half a salient pole circumferentially, the magnetic flux acts such that North-seeking (N) poles and South-seeking (S) poles are disposed alternately in a circumferential direction when viewed from an axial direction. Thus, the rotary machine 1 operates as a magnetic inductor synchronous rotary machine that has a six-slot concentrated winding stator coil 11 relative to a four-pole rotor 3 that is constituted by two N poles and two S poles that are disposed so as to be adjacent axially.

Figure 4:
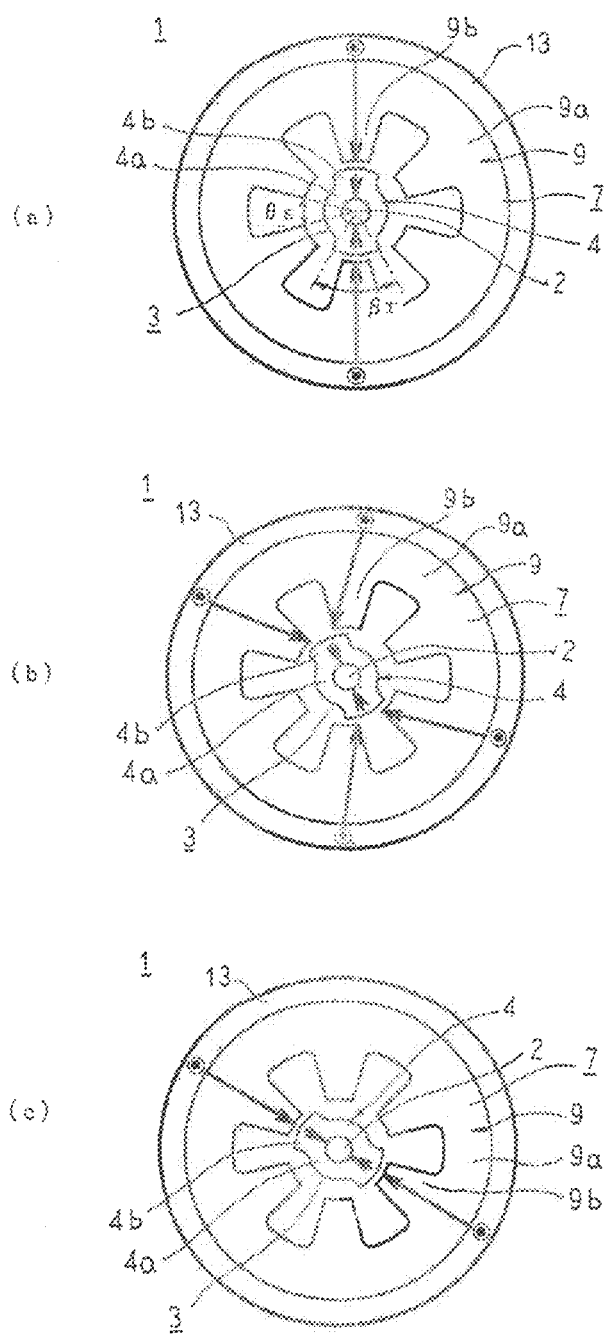
FIG. 4 is a front elevation that explains operation of the rotary machine according to Embodiment 1 of the present invention.
Figure 5:
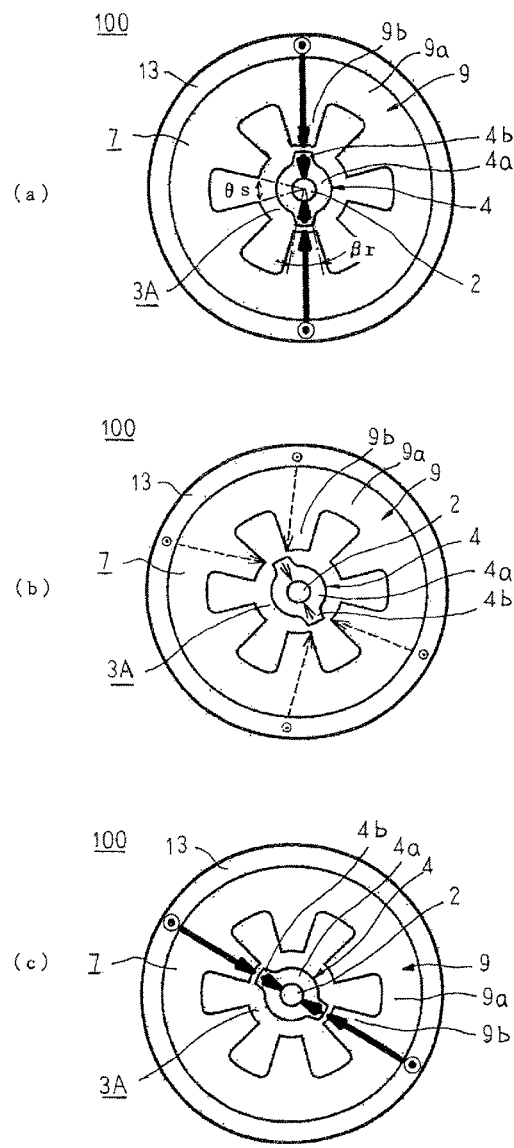
FIG. 5 is a front elevation that explains operation of a rotary machine that functions as a comparative example.

Next, core loss reducing effects according to Embodiment 1 will be explained with reference to FIGS. 4 and 5. FIG. 4 is a front elevation that explains operation of the rotary machine according to Embodiment 1 of the present invention, and FIG. 5 is a front elevation that explains operation of a rotary machine that functions as a comparative example. Now, a stator slot opening width θs can be expressed by an angle (central angle) that is formed by line segments that connect two circumferential ends of a slot opening and a central axis of the rotating shaft in a plane that is perpendicular to the central axis of the rotating shaft. A rotor salient pole width βr can be expressed by an angle (central angle) that is formed by line segments that connect two circumferential ends of an outer peripheral surface of the salient poles and a central axis of the rotating shaft in a plane that is perpendicular to the central axis of the rotating shaft. In the rotary machine 100 of the comparative example, the slot opening width θs of a stator 7 is formed so as to be greater than the salient pole width βr of a rotor 3A. Moreover, in FIG. 5, identical numbering has been given to portions identical to or corresponding to those in the rotary machine shown in FIG. 4 to facilitate explanation. In FIGS. 4 and 5, magnitude of the amount of magnetic flux is represented by the thickness of the arrows.

First, the rotary machine 100 that functions as a comparative example that is shown in FIG. 5 will be explained.

As the rotor 3A rotates, the salient poles 4b proceed from a state facing the teeth 9b that is shown in FIG. 5(a), through a state facing the openings of the slots 9c that is shown in FIG. 5(b), to a state facing the next teeth 9b that is shown in FIG. 5(c).

In the state that is shown in FIG. 5(a), magnetic resistance between the stator 7 and the rotor 3A is low because the salient poles 4b are facing the teeth 9b. Thus, magnetic flux that the field coil 12 produces enters the first stator core 9 from the housing 13, flows radially inward through the first stator core 9, and enters the salient poles 4b via an air gap between the salient poles 4b and the teeth 9b. Next, the magnetic flux flows radially inward through the first rotor core 4, a portion of that magnetic flux flows axially through the base portion 4a and the partitioning wall 6, and a remaining portion of the magnetic flux flows axially through the rotating shaft 2. Next, although not shown, the magnetic flux enters the second rotor core 5, flows radially outward, enters the second stator core 10 from the salient poles 5b, flows radially outward through the second stator core 10, flows axially through the housing 13, and returns to the first stator core 9. Thus, a magnetic path is formed that circles around the field coil 12. Here, as indicated by the thick arrows in FIG. 5(a), the amount of magnetic flux that flows radially through the first and second stator cores 9 and 10 and the first and second rotor cores 4 and 5, and the amount of magnetic flux that flows axially through the rotating shaft 2 and the housing 13 are large.

Then, when the rotor 3A rotates, and the salient poles 4b are at positions that face the openings of the slots 9c, the magnetic flux enters the salient poles 4b from circumferential end portions of the inner peripheral ends of the teeth 9b, and magnetic resistance between the stator 7 and the rotor 3A increases significantly. Thus, the amount of magnetic flux that the field coil 12 produces decreases rapidly, and as indicated by the slender arrows in FIG. 5(b), the amount of magnetic flux that flows radially through the first and second stator cores 9 and 10 and the first and second rotor cores 4 and 5, and the amount of magnetic flux that flows axially through the rotating shaft 2 and the housing 13 is reduced.

When the rotor 3A rotates further, and the salient poles 4b are at positions that face the teeth 9b, magnetic resistance between the stator 7 and the rotor 3A is reduced. Thus, as indicated by the thick arrows in FIG. 5(c), the amount of magnetic flux that flows radially through the first and second stator cores 9 and 10 and the first and second rotor cores 4 and 5, and the amount of magnetic flux that flows axially through the rotating shaft 2 and the housing 13 is increased.

Thus, in the rotary machine 100 of the comparative example, a magnetic flux component that flows radially through the first and second stator cores 9 and 10 and the first and second rotor cores 4 and 5, and a magnetic flux component that flows axially through the rotating shaft 2 and the housing 13 fluctuate significantly.

Now, because the first and second stator cores 9 and 10 are constituted by laminated bodies of magnetic steel plates, the occurrence of eddy currents due to the fluctuations in the magnetic flux component that flows radially through the first and second stator cores 9 and 10 is suppressed, and does not constitute a significant core loss problem. Similarly, the fluctuations in the magnetic flux component that flows radially through the first and second rotor cores 4 and 5 also do not constitute a significant core loss problem.

However, eddy currents are generated in the plane of lamination of the laminated bodies of magnetic steel plates by the increase and decrease (fluctuation) in the magnetic flux component flowing axially through the rotating shaft 2 and the housing 13, and constitute a significant core loss. Even if dust cores in which iron dust that has been coated in resin is compression molded are used instead of the laminated bodies of magnetic steel plates, eddy current loss as a result of the magnetic flux fluctuations, and core loss such as hysteresis loss, etc., arise because there is electroconductivity.

In the rotary machine 1 according to Embodiment 1, the salient pole width $\beta r$ of the rotor 3 is formed so as to be greater than the slot opening width $\theta s$ of the stator 7, as shown in FIG. 4.

Thus, as the rotor 3 rotates, the salient poles 4b proceed from a state facing teeth 9b that is shown in FIG. 4(a), through a state facing two adjacent teeth that is shown in FIG. 4(b), to a state facing the next teeth 9b that is shown in FIG. 4(c).

Thus, because the salient poles 4b are always in a state facing the teeth 9b even if the rotor 3 rotates, magnetic resistance between the rotor 3 and the stator 7 can be kept low, and fluctuations in the amount of magnetic flux kept to a minimum.

Consequently, according to Embodiment 1, fluctuations in the amount of magnetic flux that flows axially, which constitute a factor in eddy currents, are reduced, suppressing the occurrence of eddy currents, and enabling a high-efficiency rotary machine to be achieved.

Heat that is generated in the rotor 3 can be transferred to the bearings through the rotating shaft 2, bringing about thermal degradation of lubricating oil and grease in the bearings, and leading to shortening of bearing life. In super-high-speed rotation operation that is at high frequencies, heat that is generated in the rotor 3 becomes more pronounced. However, according to Embodiment 1, the occurrence of eddy currents is suppressed, reducing the heat that is generated in the rotor 3.

Thus, if the present rotary machine 1 is used in motors such as electrically assisted turbochargers, etc., that require super-high-speed rotation, there are no problems with axial resonance during super-high-speed rotation, and extension of service life of the bearings can be achieved.

Figure 6:
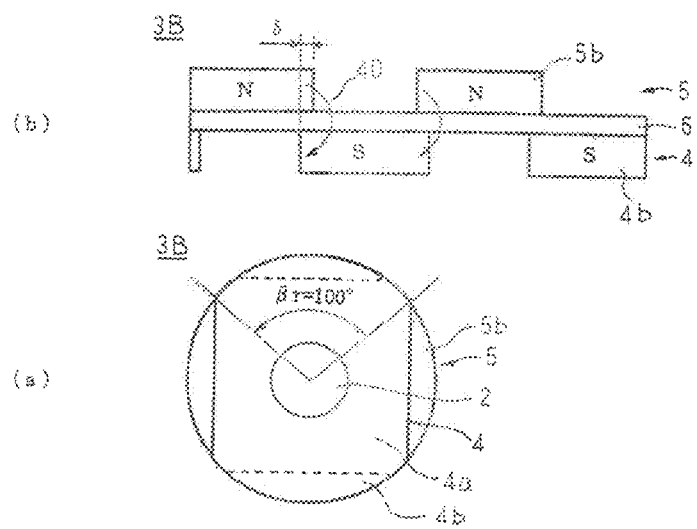
FIG. 6 is a diagram that explains a construction of a rotor in which salient pole width βr is 100 degrees.
Figure 7:
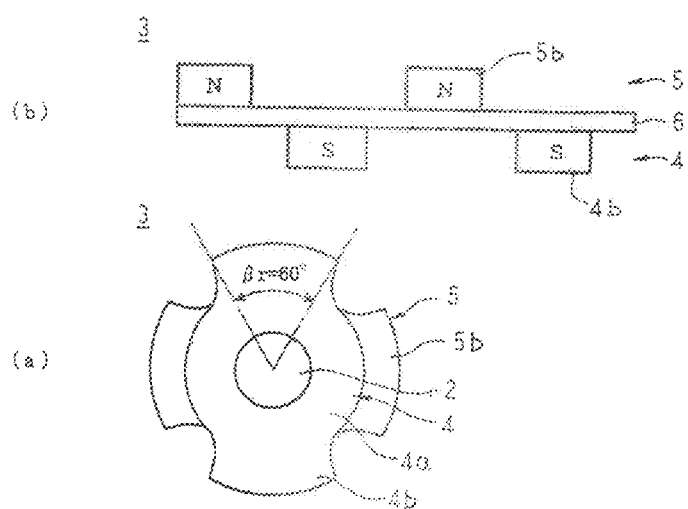
FIG. 7 is a diagram that explains a construction of a rotor in which salient pole width βr is 60 degrees.

Next, constraints on rotor salient pole width $\beta r$ will be explained with reference to FIGS. 6 and 7. FIG. 6 is a diagram that explains a construction of a rotor in which salient pole width $\beta r$ is 100 degrees, FIG. 6(a) being a front elevation thereof, and FIG. 6(b) is a developed plan in which a rotor being expanded circumferentially. FIG. 7 is a diagram that explains a construction of a rotor in which salient pole width $\beta r$ is 60 degrees, FIG. 7(a) being a front elevation thereof, and FIG. 7(b) being a developed plan in which a rotor is expanded circumferentially. Moreover, a partitioning wall 6 is omitted in FIG. 6(a) and FIG. 7(b).

The number of salient poles Nr of a rotor 3B that is shown in FIG. 6 is two, and the salient pole width $\beta r$ is 100 degrees. As indicated by the overlapping portion $\delta$ in FIGS. 6(a) and 6(b), a portion of the salient poles 4b (N poles) of the first rotor core 4 and a portion of the salient poles 5b (S poles) of the second rotor core 5 overlap in an axial direction. When this overlapping portion 6 is integrated axially, leakage flux 40 is generated that has ineffective axial components that do not act as effective magnetic poles and do not contribute to torque. Not only does this leakage flux 40 not contribute to the torque, it magnetically saturates each of the magnetic paths of the rotary machine, reducing effective magnetic flux that contributes to torque, and lowering output. Since the amount of this ineffective leakage flux 40 changes depending on the position of the rotor 3B, it becomes a factor in core loss, and is problematic.

This loss generating mechanism will now be explained.

When the overlapping portion $\delta$ comes to a position that faces a tooth 9b of the first stator core 9, axial leakage flux 40 flows through a pathway that extends from the tooth 9b of the first stator core 9 through a salient pole 4b of the first rotor core 4 and a salient pole 5b of the second rotor core 5 to a tooth 10b of the second stator core 10. Because the magnetic resistance of this pathway is small, the amount of magnetic flux in this leakage flux 40 is large, and also the components of that magnetic flux are mainly axial components. Then, when the overlapping portion $\delta$ comes to a positions that faces a slot 9c of the first stator core 9, the amount of magnetic flux in this leakage flux 40 is small because magnetic resistance between the salient pole 4b and the teeth 9b increases, and the components of that magnetic flux are mainly circumferential components and radial components. Consequently, the magnitude of the amount of magnetic flux of the leakage flux 40 fluctuates as a three-dimensional vector as the rotor position changes.

As a result, fluctuation of axial magnetic flux components in particular is a problem. The reason for this is that, among the laminated body portions of the rotor and the stator, these fluctuations in the leakage flux 40 arise in the vicinity of air gaps in particular, and since the eddy currents that arise as a result of the increases and decreases in axial magnetic flux components flow in the plane of the laminated cores, effects due to the rotor and the stator being constituted by laminated bodies cannot be achieved. In concentrated-winding magnetic inductor rotary machines such as in the present rotary machine, since magnetic flux that is generated in the overlapping portion δ is a portion of the main magnetic flux, the amount of magnetic flux is large and fluctuates at high frequencies. As a result, fluctuations in axial magnetic flux components constitute a significant core loss.

The number of salient poles Nr of a rotor 3 that is shown in FIG. 7 is two, and the salient pole width βr is 60 degrees. As can be seen from FIGS. 7(a) and 7(b), the axial overlapping portion δ between the salient poles 4b (N poles) of the first rotor core 4 and the salient poles 5b (S poles) of the second rotor core 5 is eliminated in this rotor construction. Thus, because the axial overlapping portion δ between the salient poles 4b of the first rotor core 4 and the salient poles 5b of the second rotor core 5 is not formed in this rotor 3, the leakage flux 40 described above does not arise, enabling core loss to be reduced.

From the above, if a magnetic inductor rotary machine that includes a concentrated winding stator coil is to be operated at super-high-speed rotation, it is desirable for the rotor to be configured so as to satisfy 180/Nr>βr>θs. Here, the number of rotor salient poles Nr corresponds a value that is half the number of rotor poles in the rotor (total number of salient poles). In other words, the number of rotor salient poles Nr is the number of salient poles in the first rotor core 4 (or in the second rotor core 5).

Moreover, in Embodiment 1 above, a rotary machine in which the number of rotor salient poles is two (the number of rotor poles is four), and the number of stator slots is six has been explained, but the number of rotor salient poles and the number of stator slots are not limited to these numbers.

For example, in a rotary machine that includes a three-phase concentrated winding stator coil, a number of slots that is a multiple of three can be selected. However, if the greatest common divisor between the number of rotor salient poles and the number of stator slots is one, radial magnetic attraction is increased, generating vibration noise. If the number of rotor salient poles and the number of stator slots are equal, then a three-phase motor will not be formed. The fewer the number of stator slots, the further the number of coils in the stator coil can be reduced, enabling high mass-producibility and reduced costs to be expected for the stator. From the above, it is realistic for the number of stator slots to be selected from among six, nine, or twelve. When one, which self-evidently would give rise to gravimetric imbalances, is excluded, two or four, three or six, or four or eight, etc., are conceivable as the number of rotor salient poles that corresponds thereto.

Consequently, it is desirable for the rotary machine to be designed so as to satisfy:

$$Ns=3\times(N+1);$$

$$Nr=M\times(N+1); \text{ and}$$

$$180/Nr>\beta r>\theta s$$

where Ns is the number of stator teeth, Nr is the number of rotor salient poles, βr is rotor salient pole width, and θs is stator slot opening width. Here, M=1 or 2, and N=1, 2, or 3.

Moreover, in Embodiment 1 above, a housing 13 is prepared using a solid magnetic body, and is used as an axial magnetic path forming member, but an axial magnetic path forming member may also be configured by disposing a member that is cylindrical or that has a circular arc-shaped cross section that is prepared using a solid magnetic body of iron, etc., so as to span and link outer peripheral surfaces of the core backs 9a and 10a to each other. In that case, it is not necessary to prepare the housing using a magnetic body, and it can be prepared using a metal such as a stainless alloy, etc., or a resin.

Embodiment 2

Figure 8:
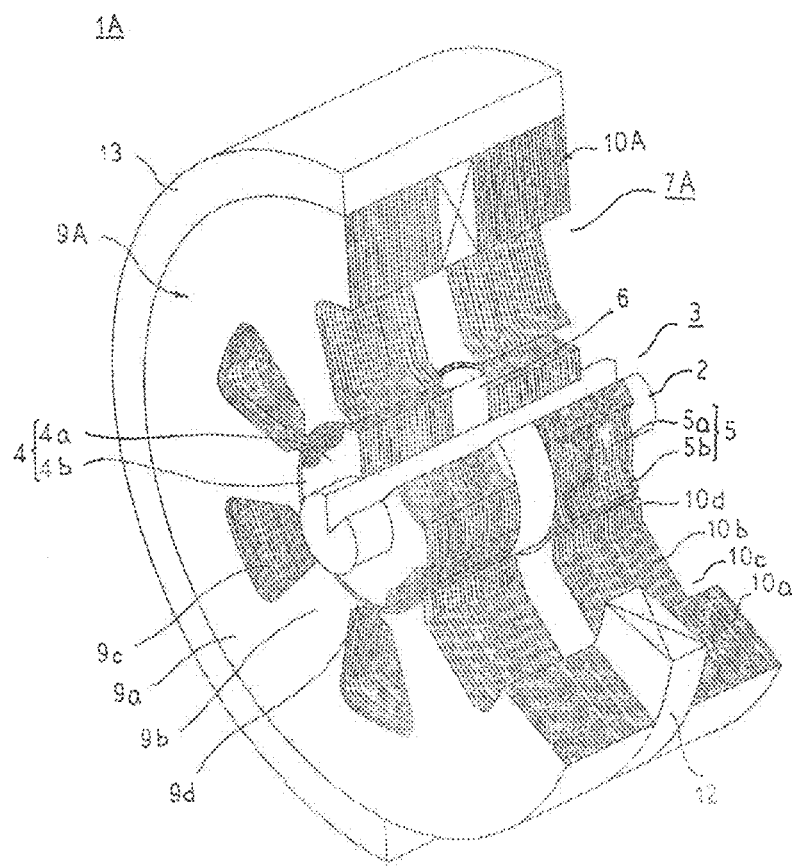
FIG. 8 is a partially cut away perspective that shows a rotary machine according to Embodiment 2 of the present invention.

FIG. 8 is a partially cut away perspective that shows a rotary machine according to Embodiment 2 of the present invention. Moreover, a stator coil has been omitted in FIG. 8.

In FIG. 8, a first stator core 9A includes: a cylindrical core back 9a; and six teeth 9b that are disposed so as to project radially inward from an inner peripheral surface of the core back 9a at a uniform angular pitch circumferentially. Flange portions 9d are disposed so as to extend in two circumferential directions from inner peripheral end portions of the teeth 9b to reduce opening widths of the slots 9c. A second stator core 10A is prepared into an identical shape to the first stator core 9A, and flange portions 10d are disposed so as to extend in two circumferential directions from inner peripheral end portions of teeth 10b to reduce opening widths of slots 10c.

Moreover, the rest of the configuration is configured in a similar manner to Embodiment 1 above.

In a rotary machine 1A that is configured in this manner, the number of teeth Ns in the stator 7A is six, the number of salient poles Nr in the rotor 3 is two, and 180/Nr>βr>θs is satisfied, in a similar manner to the rotary machine 1 according to Embodiment 1 above.

Consequently, similar effects to those in Embodiment 1 above can also be achieved in Embodiment 2.

In Embodiment 2, because the flange portions 9d and 10d are disposed so as to extend in two circumferential directions from the inner peripheral end portions of the teeth 9b and 10b, design of a stator that satisfies βr>θs is facilitated even in cases where the salient pole width βr cannot be increased.

Embodiment 3

Figure 9:
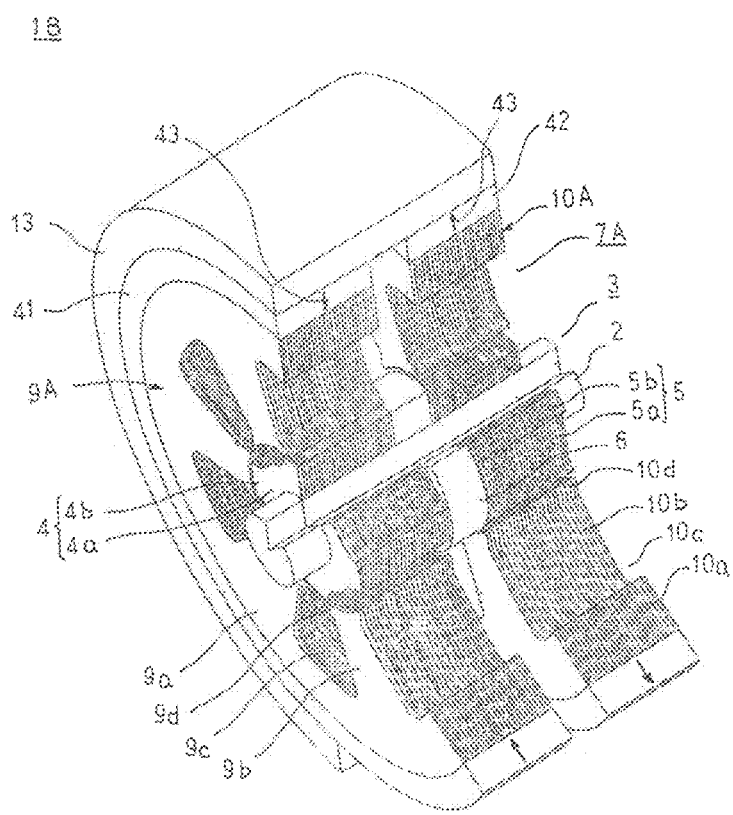
FIG. 9 is a partially cut away perspective that shows a rotary machine according to Embodiment 3 of the present invention.

FIG. 9 is a partially cut away perspective that shows a rotary machine according to Embodiment 3 of the present invention. Moreover, a stator coil has been omitted in FIG. 9.

In FIG. 9, a first permanent magnet 41 that functions as a magnetic field means is interposed in a state of close contact between a core back 9a of a first stator core 9A and an outer peripheral surface of a housing 13, and is magnetically oriented such that a direction of magnetization 43 is oriented radially inward. A second permanent magnet 42 that functions as a magnetic field means is interposed in a state of close contact between a core back 10a of a second stator core 10A and an outer peripheral surface of a housing 13, and is magnetically oriented such that a direction of magnetization 43 is oriented radially outward.

Moreover, the rest of the configuration is configured in a similar manner to Embodiment 2 above.

A rotary machine 1B that is configured in this manner, operates in a similar manner to that of the rotary machine 1 of Embodiment 1 above using first and second permanent magnets 41 and 42 instead of the field coil 12.

Consequently, similar effects to those in Embodiment 1 above can also be achieved in Embodiment 3.

Here, sintered rare-earth magnets such as neodymium-iron-boron magnets, samarium-cobalt magnets, etc., that have a high magnetic flux density, for example, can be used for the first and second permanent magnets 41 and 42. If rare-earth magnets are used as the first and second permanent magnets 41 and 42, because the magnets themselves have electroconductivity, eddy currents are generated inside the magnets due to magnetic resistance between the rotor 3 and the stator 7A fluctuating due to changes in the relative positioning between the salient poles of the rotor 3 and the teeth of the stator 7A, in other words, due to the amount of magnet magnetic flux fluctuating due to the operating points of the first and second permanent magnets 41 and 42 changing and penetrating the magnets themselves. If the temperature of the magnet portions rises due to loss, problems of thermal demagnetization become a concern. In this regard, if permanent magnet are used for the magnetic field means, it is desirable for the design to satisfy $180/Nr > \beta r > \theta s$ not only from the viewpoint of loss, but also for ensuring magnet reliability.

Moreover, in Embodiment 3 above, permanent magnets are disposed radially outside both core backs of first and second stator cores, but a permanent magnet need only be disposed radially outside a core back of at least one of the first and second stator cores.

In Embodiments 1 through 3 above, a stator core is explained as being constituted by a pair of first and second stator cores, but a stator core may also be configured such that a plurality of pairs of first and second stator cores are arranged coaxially in an axial direction such that circumferential positions of teeth are aligned. In that case, a rotor will also be configured such that a plurality of pairs of first and second rotor cores are arranged coaxially such that circumferential positions of salient poles in the first rotor cores are aligned, and circumferential positions of salient poles in the second rotor cores are aligned.

Embodiment 4

FIG. 10 is a configuration diagram for a system that has an automotive supercharger according to Embodiment 4 of the present invention.

In FIG. 10, the present system includes: a generator-motor 25 that is driven by rotational torque from an engine 21; and an electrically assisted turbocharger 30 that functions as an automotive supercharger that is connected to an exhaust system of the engine 21.

A pulley 26 of the generator-motor 25 is linked to a pulley 23 that is fixed to a crankshaft 22 of the engine 21 by means of a belt 24. The generator-motor 25 converts driving force that is transmitted from the engine 21 by means of the belt 24 into alternating-current power. This alternating-current power is converted to direct-current power by an inverter 27 that is mounted integrally onto the generator-motor 25 at an opposite end from the pulley 26, and charges a battery 29 and is also supplied to an on-board load (not shown).

The electrically assisted turbocharger 30 has: a turbine 31 that is disposed in an exhaust system 36 of the engine 21; a compressor 33 that is fixed to a rotating shaft 32 of the turbine 31, and that is disposed in an induction system 35 of the engine 21; and a super-high-speed rotary machine 34 that is mounted coaxially onto the rotating shaft 32. The super-high-speed rotary machine 34 includes a generating function and an electric motor function, and is electrically connected to the inverter 27 of the generator-motor 25 by means of large-current wiring 28.

Operation of an electrically assisted turbocharger 30 that has been configured in this manner will be explained.

First, in a normal state, intake gas A is supplied to the engine 21 by means of the induction system 35, and is combusted inside the engine 21. After combustion, exhaust gas B is discharged externally by means of the exhaust system 36. The turbine 31 is driven by the exhaust gas B that flows through the exhaust system 36. The compressor 33 that is fixed to the rotating shaft 32 of the turbine 31 is thereby driven to rotate, supercharging the intake gas A to greater than or equal to atmospheric pressure.

If the driver of the vehicle tries to accelerate by operating an accelerator, the reaction of the compressor 33 will be delayed because it will not be possible to provide sufficient power to the turbine 31 for approximately one or two seconds until the engine 21 is at greater than or equal to a predetermined rotational speed and the exhaust gas B obtains sufficient fluid power, giving rise to a phenomenon known as "turbo lag". Here, direct-current power from the battery 29 is converted to alternating-current power by the inverter 27, and is supplied to the super-high-speed rotary machine 34 by means of the large-current wiring 28 to drive the super-high-speed rotary machine 34. Thus, at the low speeds at which turbo lag occurs, the rotating shaft 32 is subjected to a driving force even if sufficient fluid power cannot be achieved from the exhaust gas B, enabling the compressor 33 to be driven promptly, and suppressing the occurrence of turbo lag.

During high-speed motion or heavy-load motion of a vehicle, the exhaust gas B has a fluid energy that is greater than or equal to the power required by the electrically assisted turbocharger 30 for supercharging. In that case, electric power can be supplied to the battery 29 and the on-board load by operating the super-high-speed rotary machine 34 as a generator, and operating the inverter 27 in a regenerating mode.

In an electrically assisted turbocharger 30, performance of the turbocharger can be improved significantly by adding a super-high-speed rotary machine 34 in this manner, but if a conventional permanent magnet synchronous rotary machine is used in the super-high-speed rotary machine 34, problems arise holding the magnets that function as a magnetic field means. If a conventional magnetic inductor rotary machine that includes a distributed winding stator coil is used in the super-high-speed rotary machine 34 in order to avoid these magnet holding problems, axial lengths of the coil ends of the stator coil are increased, increasing the distance between the bearings that rotatably support the rotating shaft, and generating problems of axial resonance.

If a conventional magnetic inductor rotary machines that includes a concentrated winding stator coil is used in the super-high-speed rotary machine 34 in order to avoid these problems of axial resonance, core loss due to fluctuations in the amount of axial magnetic flux arises, and respective portions of the super-high-speed rotary machine 34 generate heat. When operating in a high-temperature environment as an electrically assisted turbocharger 30 does, the super-high-speed rotary machine 34 itself generates heat in addition to the high environmental temperatures, further increasing the temperature of the super-high-speed rotary machine 34. The heat from the super-high-speed rotary machine 34 is transferred to the bearings through the rotating shaft 32, bringing about thermal degradation of lubricating oil and grease in the bearings, and leading to shortening of bearing life. Thus, using a conventional magnetic inductor rotary machine that includes a concentrated winding stator coil in the super-high-speed rotary machine 34 could not be achieved without disposing a large-scale cooling mechanism, and has been impractical.

Because the present rotary machine 1 includes a concentrated winding stator coil, the distance between the bearings can be shortened, increasing the axial rigidity, and enabling problems of axial resonance during operation at super-high-speed rotation to be avoided. Because the present rotary machine 1 can greatly reduce fluctuations in the amount of axial magnetic flux, core loss is reduced, enabling heat that is generated in the rotary machine 1 itself to be suppressed. Consequently, problems of axial resonance can be eliminated by using the present rotary machine 1 in a super-high-speed rotary machine 34, and it is not necessary to dispose a large-scale cooling mechanism, enabling a high-performance, compact electrically assisted turbocharger 30 to be achieved inexpensively.

Moreover, in Embodiment 4 above, the present rotary machine is explained as being used in a super-high-speed rotary machine of a electrically assisted turbocharger that functions as a fluid transfer apparatus, but the present rotary machine is not limited to electrically assisted turbochargers, and can be applied to motors of fluid transfer apparatuses that can be operated at super-high speed rotation, such as vacuum cleaners, or jet towels (dryers), etc., that rotate a centrifugal fan at high speed, for example.

In each of the above embodiments, stator core teeth are arranged at a uniform angular pitch circumferentially, and an array pitch of circumferential centers of slot openings is a uniform angular pitch. However, it is not absolutely necessary for the array pitch of the circumferential centers of the slot openings to be a uniform angular pitch, and it may also be a nonuniform pitch. In that case, the array pitch of the circumferential centers of the slot openings can be made into a nonuniform pitch, for example, by changing the array pitch of the teeth, or the circumferential widths of the teeth, etc. Flange portions that project circumferentially from tips of the teeth can also be disposed, and the array pitch of the circumferential centers of the slot openings can be made into a nonuniform pitch by changing lengths of circumferential projection of the flange portions.

In each of the above embodiments, all slot opening widths are explained as being formed equally, but it is not absolutely necessary to make all of the slot opening widths equal provided that each of the slot opening widths is formed so as to be less than a salient pole width of the first and second rotor cores.

What is claimed is:

1. A magnetic inductor rotary machine comprising:
    a stator including
        a stator core having a first stator core and a second stator core with identical shapes and a plurality of teeth that circumferentially partition off slots that have openings on an inner peripheral side, each tooth in the first stator core is aligned in a circumferential direction and separated in an axial direction from a corresponding tooth in the second stator core to form pairs of aligned teeth, and the teeth project radially inward from an inner peripheral surface of a cylindrical core back, and
        a stator coil that is mounted to said stator core in a concentrated winding, said stator coil including a plurality of three phase coils each of which is wound around only one pair of the aligned teeth without spanning any of the slots;
    a rotor including a first rotor core and a second rotor core that are prepared into identical shapes wherein salient poles are disposed at a uniform angular pitch circumferentially, and that are fixed coaxially to a rotating shaft so as to be positioned on inner peripheral sides of said first stator core and said second stator core, respectively, and so as to be offset circumferentially by a pitch of half a salient pole from each other;
    a magnetic field means that is disposed on said stator, and that generates field magnetic flux such that said salient poles of said first rotor core and said salient poles of said second rotor core have different polarity; and
    an axial magnetic path forming member that is disposed so as to extend axially so as to link an outer peripheral surface of said core back of said first stator core and an outer peripheral surface of said core back of said second stator core, wherein
    a magnetic path is formed in which said magnetic flux generated by said magnetic field means enters said salient poles of said first rotor core from said first stator core, flows axially through said first rotor core and said rotating shaft, enters said second rotor core, enters said second stator core from said salient poles of said second rotor core, flows axially through the axial magnetic path forming member, and returns to said first stator core,
    a salient pole width of said salient poles of said first rotor core and said second rotor core is greater than an opening width of said slots of said stator, and
    the number of teeth Ns in each of said first stator core and said second stator core satisfies $Ns=3\times(N+1)$, and the number of salient poles Nr in each of said first rotor core and said second rotor core satisfies $Nr=M\times(N+1)$, where $M=1$ or 2, and $N=1$, 2, or 3.

2. A magnetic inductor rotary machine according to claim 1, wherein said salient pole width of said salient poles of said first rotor core and said second rotor core is configured so as to be less than $(180/Nr)$ degrees.

3. A magnetic inductor rotary machine according to claim 1, wherein said magnetic field means is a permanent magnet that is disposed between a core back of at least one of said first stator core and said second stator core and said axial magnetic path forming member.

4. A magnetic inductor rotary machine according to claim 1, wherein said magnetic field means is a cylindrical coil that is interposed between said core backs of said first stator core and said second stator core.

5. A magnetic inductor rotary machine according to claim 1, wherein said first stator core, said second stator core, said first rotor core, and said second rotor core are prepared by laminating magnetic steel plates, and said rotating shaft and said axial magnetic path forming member are prepared using solid magnetic bodies.

6. A fluid transfer apparatus in which a magnetic inductor rotary machine according to claim 1 is used as a motor.

7. A magnetic inductor rotary machine comprising:
    a stator comprising:
        a stator core that is configured such that a first stator core and a second stator core that are prepared into identical shapes wherein a plurality of teeth that partition off slots that have openings on an inner peripheral side are disposed so as to line up circumferentially so as to project radially inward from an inner peripheral surface of a cylindrical core back are disposed coaxially so as to be separated by a predetermined distance axially and such that circumferential positions of said teeth are aligned, and a stator coil that is mounted to said stator core in a concentrated winding, said stator coil including three phase coils;

a rotor including a first rotor core and a second rotor core that are prepared into identical shapes wherein salient poles are disposed at a uniform angular pitch circumferentially, and that are fixed coaxially to a rotating shaft so as to be positioned on inner peripheral sides of said first stator core and said second stator core, respectively, and so as to be offset circumferentially by a pitch of half a salient pole from each other;

a magnetic field means that is disposed on said stator, and that generates field magnetic flux such that said salient poles of said first rotor core and said salient poles of said second rotor core have different polarity; and an axial magnetic path forming member that is disposed so as to extend axially so as to link an outer peripheral surface of said core back of said first stator core and an outer peripheral surface of said core back of said second stator core, wherein a magnetic path is formed in which said magnetic flux generated by said magnetic field means enters said salient poles of said first rotor core from said first stator core, flows axially through said first rotor core and said rotating shaft, enters said second rotor core, enters said second stator core from said salient poles of said second rotor core, flows axially through the axial magnetic path forming member, and returns to said first stator core, a salient pole width of said salient poles of said first rotor core and said second rotor core is greater than an opening width of said slots of said stator, the number of teeth $Ns$ in each of said first stator core and said second stator core satisfies $Ns=3\times(N+1)$, and the number of salient poles $Nr$ in each of said first rotor core and said second rotor core satisfies $Nr=M\times(N+1)$, where $M=1$ or $2$, and $N=1$, $2$, or $3$, and said salient pole width of said salient poles of said first rotor core and said second rotor core is configured so as to be less than $(180/Nr)$ degrees.

* * * * *